(12) United States Patent
Kim et al.

(10) Patent No.: US 7,522,637 B2
(45) Date of Patent: Apr. 21, 2009

(54) DYNAMIC RESOURCE ALLOCATION METHOD FOR AN OFDMA SYSTEM

(75) Inventors: Il-Whan Kim, Incheon (KR); Sang-Boh Yun, Seongnam-si (KR); Sung-Hyun Cho, Seoul (KR); Won-Hyoung Park, Seoul (KR); Chung-Gu Kang, Seoul (KR); Jeong-Hwan Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 653 days.

(21) Appl. No.: 11/178,919

(22) Filed: Jul. 11, 2005

(65) Prior Publication Data

US 2006/0007849 A1    Jan. 12, 2006

(30) Foreign Application Priority Data

Jul. 10, 2004    (KR) .............. 10-2004-0053812

(51) Int. Cl.
*H04J 1/00*    (2006.01)
(52) U.S. Cl. ..................................... 370/480
(58) Field of Classification Search ............. 370/480, 370/328, 329, 468, 341, 348, 338, 441, 442, 370/336, 337, 320, 321, 203, 208, 209, 395.4, 370/395.41, 42; 455/452.2, 453, 465, 452, 455/500, 509, 522, 455, 67.1
See application file for complete search history.

(56) References Cited

U.S. PATENT DOCUMENTS

| | | | | |
|---|---|---|---|---|
| 5,742,592 A | * | 4/1998 | Scholefield et al. | 370/329 |
| 6,081,536 A | * | 6/2000 | Gorsuch et al. | 370/468 |
| 6,144,653 A | * | 11/2000 | Persson et al. | 370/337 |
| 6,728,233 B1 | * | 4/2004 | Park et al. | 370/342 |
| 7,373,151 B1 | * | 5/2008 | Ahmed | 455/452.2 |
| 2004/0001429 A1 | | 1/2004 | Ma et al. | |

OTHER PUBLICATIONS

Guoqing Li et al., "Downlink Dynamic Resource Allocation for Multi-Cell OFDMA System", Vehicular Technology Conference, Oct. 6, 2003.

* cited by examiner

*Primary Examiner*—Chi H Pham
*Assistant Examiner*—Alexander Boakye
(74) *Attorney, Agent, or Firm*—The Farrell Law Firm, PC

(57) ABSTRACT

A dynamic resource allocation method in an OFDMA system is provided. A base station determines if each of a plurality of SSs supports subchannel-based dynamic resource allocation. If an SS supports the subchannel-based dynamic resource allocation, the base station allocates resources to the SS on a subchannel basis. If the SS does not support the subchannel-based dynamic resource allocation, the base station allocates resources to the SS on a burst basis.

8 Claims, 5 Drawing Sheets

```
DL-MAP () {
Bas Station ID                                    16 bits
```

```
MAP type                                          4 bits
No. DL_MAP_IE                                     4 bits
For (i=1, i<=(No. DL_MAP_IE); i++ {
     DL MAP IE
            }
```

```
MAP type                                          4 bits
No. DL_MAP_IE                                     4 bits
For (i=1, i<=(No. DL_MAP_IE); i++ {
     DL MAP IE
            }
```

```
UL-MAP () {
Bas Station ID                              16 bits
```

```
MAP type                                     4 bits
No. UL_MAP_IE                                4 bits
For (i=1, i<=(No. UL_MAP_IE); i++ {
    UL MAP IE
        }
```

```
MAP type                                     4 bits
No. DL_MAP_IE                                4 bits
For (i=1, i<=(No. UL_MAP_IE); i++ {
    UL MAP IE
        }
```

DYNAMIC RESOURCE ALLOCATION METHOD FOR AN OFDMA SYSTEM

PRIORITY

This application claims priority under 35 U.S.C. § 119 to an application entitled "Dynamic Resource Allocation Method for an OFDMA System" filed in the Korean Intellectual Property Office on Jul. 10, 2004 and assigned Serial No. 2004-53812, the contents of which are incorporated herein by reference.

BACKGROUND OF THE INVENTION

1. Field of the Invention

The present invention relates generally to an OFDMA (Orthogonal Frequency Division Multiple Access) cellular communication system, and in particular, to a resource allocation method for an OFDMA cellular communication system.

2. Description of the Related Art

For future-generation mobile communications, high-speed, high-quality data transmission is required to support various multimedia services having a high quality. In order to provide these high quality services, active studies have recently been conducted on OFDMA.

OFDM (Orthogonal Frequency Division Multiplexing), the operation on which OFDMA is based, is used as a physical layer transmission scheme for diverse wireless communication systems including WLAN (Wireless Local Area Network), digital TV, and future-generation mobile communication systems because of its capability for high-speed communication on a frequency selective fading channel with a low equalization complexity.

IEEE 802.16 is one of the wideband wireless communication standards developed by IEEE work groups, and approved in December 2001. IEEE 802.16 is for fixed broadband wireless systems using a point-to-multipoint architecture, defining the use of bandwidth between the licensed 10 GHz and 66 GHz. Ratified in January 2003, an amendment to the IEEE 802.6, IEEE 802.16a provides a non-line-of-sight extension in bandwidth between 2 GHz and 11 GHz to support transmission at 700 Mbps within a range of up to 50 kilometers.

The IEEE 802.16 protocol defines a PHY (PHYsical) layer, a MAC (Medium Access Control) layer, and convergence sublayers (CS) for transport of IP (Internet Protocol), Ethernet, and ATM (Asynchronous Transfer Mode).

Many technologies are under discussion to support high data rates in OFDMA wireless communication systems including IEEE 802.16 systems. The majority of them are directed to dynamic frequency and power resource allocation mechanisms for subchannels or subcarriers. Resource allocation requires accurate channel information and notification of specific allocation information. The PHY standard of $4^{th}$ generation mobile communication systems is directed to frequency hopping and a plurality of subcarriers. Therefore, transmission of a common dynamic resource allocation information message related to hundreds of subcarriers to all subscriber stations (SSs) causes serious control load in the systems. More specifically, on the downlink, frequency hopping is assumed on a per-OFDM symbol basis. Accordingly, as many pieces of resource allocation information as a power of the number of allocated time resources are required.

A radio frame defined in the IEEE 802.16 standard starts with a preamble for synchronization and downlink transmission, and is followed by control fields including downlink MAP (DL-MAP) and uplink MAP (UL-MAP) messages.

The DL-MAP message includes parameters such as PHY Synchronization, Base Station Identification (BS ID), Allocation Start Time, Number of Elements, and MAP Information Elements (MAP IEs). The DL-MAP IEs each include Downlink Interval Usage Code (DUIC) by which downlink transmission is defined. Meanwhile, the UL-MAP message provides the start time of each uplink transmission for the SS in the base station, together with Uplink Interval Usage Code (UIUC) for each burst. The IEEE 802.16d standard defines the DL-MAP IE in the following table.

TABLE 1

| DL-MAP Information Element ( ) { | |
|---|---|
| DIUC | 4 bits |
| OFDMA Symbol Offset | 10 bits |
| Subchannel Offset | 5 bits |
| Boosting | 3 bits |
| No. OFDMA Symbols | 9 bits |
| No. Subchannels | 5 |
| } | |

In Table 1, the DL-MAP IE defines subchannels and OFDM symbols used for the PHY burst, and a related DIUC.

The DIUC represents a downlink interval usage code, the OFDMA Symbol Offset indicates the offset of the OFDM symbol in which the burst starts, and the Subchannel Offset indicates the lowest-index OFDM subchannel for carrying the burst. Boosting is an indicator indicating transmit power amplification, No. OFDMA Symbols indicates the number of OFDM symbols for carrying the downlink PHY burst, and No. Subchannels indicates the number of OFDMA subchannels of successive indexes used to carry the burst.

The above $4^{th}$ generation mobile communication PHY standard considers frequency hopping and multiple subcarriers. Therefore, common transmission of a dynamic resource allocation information message about hundreds of subcarriers to all SSs causes serious control load in the system. Further, on the downlink, because frequency hopping is assumed on a per-OFDM symbol basis, as many pieces of allocation information as the power of the number of allocated time resources are required.

However, the existing IEEE 802.16d standard has limits in implementing optimum resource allocation because the DL-MAP IE defines an AMCS (Adaptive Modulation and Coding Scheme) on a burst basis.

SUMMARY OF THE INVENTION

Therefore, the present invention has been designed to substantially solve at least the above problems and/or disadvantages and to provide at least the advantages described below. Accordingly, an object of the present invention is to provide a dynamic resource allocation method that enables optimum resource allocation by re-defining a downlink message in an OFDMA communication system.

Another object of the present invention is to provide a dynamic resource allocation method that enables efficient resource allocation by applying a different DL-MAP IE according to the capability of an SS by modifying a downlink message in an OFDMA communication system.

A further object of the present invention is to provide a dynamic resource allocation method that enables more efficient resource allocation by determining an AMCS for each subchannel in an OFDMA communication system.

The above and other objects are achieved by providing a dynamic resource allocation method in an OFDMA communication system.

According to one aspect of the present invention, in a dynamic resource allocation method for allocating resources to SSs according to channel status information received from the SSs in a multicarrier wireless communication system, a base station determines if each of the SSs supports subchannel-based dynamic resource allocation. If the SS supports the subchannel-based dynamic resource allocation, the base station allocates resources to the SS on a subchannel basis. If the SS does not support the subchannel-based dynamic resource allocation, the base station allocates resources to the SS on a burst basis.

According to another aspect of the present invention, in a dynamic resource allocation method for allocating resources to SSs according to channel status information received from the SSs in an OFDMA wireless communication system, a base station transmits a DL MAP to the SSs for access to DL information, receives channel status information on a subchannel basis from the SSs according to information of the DL MAP, and dynamically allocates resources on the subchannel basis to bursts to be delivered to SSs according to the channel status information and the DL MAP information.

BRIEF DESCRIPTION OF THE DRAWINGS

The above and other objects, features, and advantages of the present invention will become more apparent from the following detailed description when taken in conjunction with the accompanying drawings in which:

FIGS. 1A and 1B illustrate multi-MAP structures for the downlink and the uplink according to a preferred embodiment of the present invention;

DETAILED DESCRIPTION OF THE PREFERRED EMBODIMENT

Figure 2:
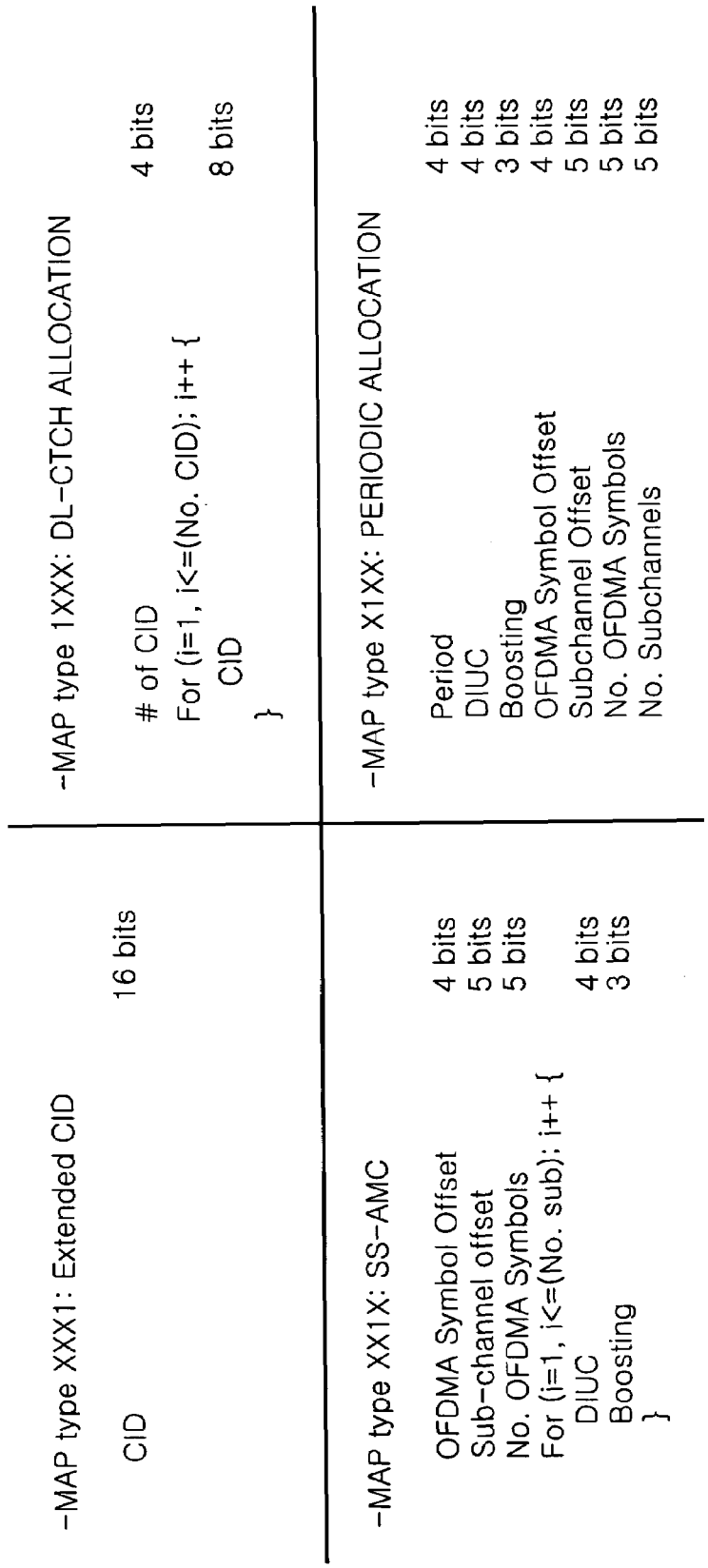
FIG. 2 conceptually illustrates multi-MAP structures depending on MAP types in a dynamic resource allocation method according to a preferred embodiment of the present invention.

Preferred embodiments of the present invention will be described in detail herein below with reference to the accompanying drawings. In the following description, well-known functions or constructions are not described in detail because they would obscure the invention in unnecessary detail.

The present invention utilizes frequency hopping on the basis of a plurality of OFDM symbols for SSs requiring a dynamic resource allocation mechanism on the downlink. A subchannel includes adjacent subcarriers that can be selected within one coherent bandwidth. The subcarriers are assumed to have the same channel characteristics. In the present invention, the DL-MAP IE is re-defined for a base station to selectively support the dynamic channel allocation algorithm to SSs requesting high-speed transmission. Table 2 below illustrates the re-defined DL-MAP IE for a resource allocation method according to a preferred embodiment of the present invention.

TABLE 2

| DL-MAP Information Element ( ) { | |
| --- | --- |
| OFDMA Symbol Offset | 10 bits |
| Subchannel Offset | 5 bits |
| No. OFDMA Symbols | 9 bits |
| No. Subchannels | 5 |
| For (i=1:i<=(No.sub);i++ { | |
| DIUC | 4 bits |
| Boosting | 3 bits |
| } | |
| } | |

As noted from Table 2, the DL-MAP IE defines the burst profiles of at least one subchannel using a plurality of DIUCs rather than using one DIUC as done conventionally. That is, DIUC and Boosting are given for each subchannel. Therefore, the volume of information for the DIUC and Boosting is determined by the number of the subchannels.

The base station can selectively allocate one of two DL-MAP IEs if an SS supports a dynamic resource allocation. That is, if the SS supports or requests a resource allocation on a subchannel basis, the base station transmits the new DL-MAP IE to the SS. However, if the SS does not support the subchannel-based resource allocation, the BS transmits the conventional DL-MAP IE illustrated in Table 1 to the SS.

As described above, the conventional DL-MAP IE provides an AMCS on a burst basis, whereas the new DL-MAP IE provides an AMCS on a subchannel basis.

When amplification is needed for a particular subchannel, the power amplification for the subchannel can be commanded using the Boosting field.

Therefore, upon receiving the conventional DL-MAP IE, the SS feeds back channel status information on a burst basis to the base station. Upon receiving the new DL-MAP IE, the SS feeds back the status information of each channel within the burst to the base station.

FIGS. 1A and 1B illustrate multiple MAP structures according to an embodiment of the present invention. In FIG. 1A, a DL-MAP message includes a plurality of DL-MAP IEs distinguished from one another by MAP type fields and supports different MAP structures according to MAP types. A UL-MAP message supports the same MAP structures as illustrated in FIG. 1B.

MAP type is 4 bits. The MAP type bits represent CTCH (Common Traffic CHannel) allocation, periodic allocation, subchannel selection AMC (SS-AMC), and extended CID sequentially in the order from the MSB (Most Significant Bit) to the LSB (Least Significant Bit).

FIG. 2 illustrates different MAP structures according to Map types in a dynamic resource allocation method according to a preferred embodiment of the present invention. Referring to FIG. 2, the MSB of the MAP type field is set to 1 when the CTCH is allocated, the next bit is set to 1 in the case of periodic allocation, the third bit is set to 1 when SS-AMC is used, and the LSB is set to 1 when an extended CID is used.

In a preferred embodiment of the present invention, it is determined whether the new or conventional DL-MAP IE is used depending on the SS-AMC bit. If the SS-AMC bit is 0, AMC information is delivered using the conventional DL-MAP IE. However, if the SS-AMC bit is 1, the AMC information is transmitted by the new DL-MAP IE.

Figure 3:
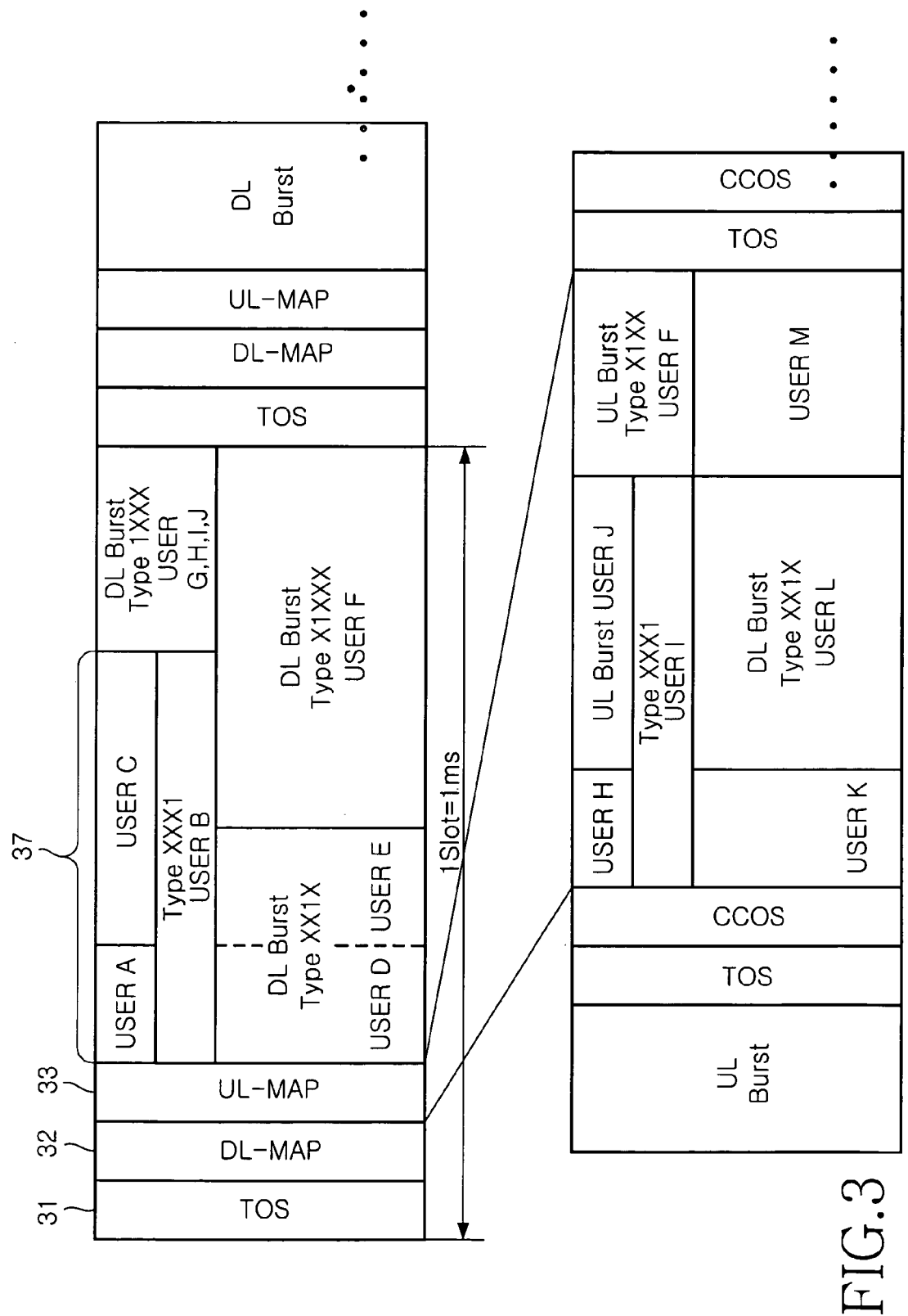
FIG. 3 illustrates a frame structure in a system using the resource allocation method according to a preferred embodiment of the present invention.

FIG. 3 illustrates a frame structure in a system using a resource allocation method according to a preferred embodiment of the present invention. Referring to FIG. 3, a DL frame includes successive slots: a TOS (Type Of Service) 31, a DL-MAP 31, a UL-MAP 33, and a data area 37 with different user bursts. Each user burst in the data area 37 is modulated and coded according to the MAP type of a DL-MAP IE for the user burst. Accordingly, the data of user D and user E with MAP type being XX1X are modulated and coded on a subchannel basis because the SS-AMC bit is 1. The data of user A with an SS AMC bit set to 0 is modulated and coded on a burst basis.

The present invention is directed to resource allocation according to MAP type. Therefore, only the SS-AMC bit of the MAP type field is addressed for conciseness. It should also be appreciated that the UL MAP is not described because the UL MAP is configured in the same manner as the DL MAP.

Figure 4:
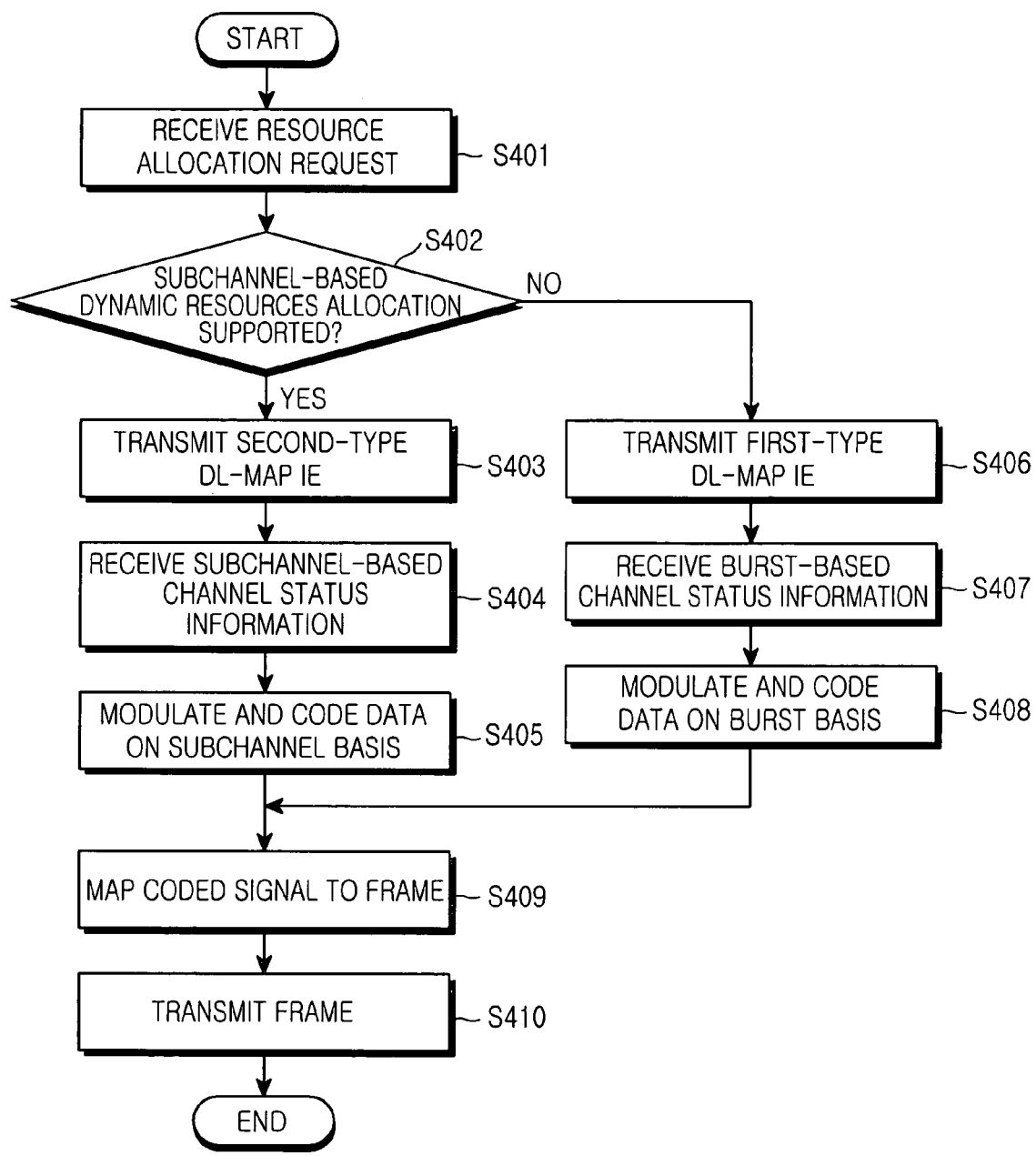
FIG. 4 is a flowchart illustrating a resource allocation method according to a preferred embodiment of the present invention.

FIG. 4 is a flowchart illustrating a resource allocation method according to a preferred embodiment of the present invention. Referring to FIG. 4, upon receipt of a resource allocation request message from the SSs in step S401, the base station determines if each of the SSs supports a subchannel-based dynamic resource allocation mode in step S402. If an SS does not support the subchannel-based dynamic resource allocation mode, the base station transmits a DL-MAP message including a first-type DL-MAP IE to the SS for burst-based dynamic resource allocation in step S406 and receives channel status information from the SS on a burst basis in step S407. The base station then modulates and encodes data to be transmitted to the SS on the burst basis according to the burst-based channel status information in step S408.

However, if an SS supports the subchannel-based dynamic resource allocation mode, the base station transmits a DL-MAP message including a second-type DL-MAP IE to the SS for subchannel-based dynamic resource allocation in step S403 and receives channel status information from the SS on a subchannel basis in step S404. The base station then modulates and encodes data to be transmitted to the SS on the subchannel basis according to the subchannel-based channel status information in step S405.

After step S405 or S408, the base station maps the coded signal to a frame and transmits the frame in steps S409 and S410.

As described above, the inventive dynamic resource allocation method allocates resources on a burst basis or on a channel basis using DL-MAP IEs, which are differently defined according to the performances or requests of SSs in an OFDMA wireless communication system. Consequently, efficient resources management is enabled. Further, the subchannel-based resource allocation enables fine resources management and subchannel-based power allocation, compared to the burst-based resource allocation. Consequently, total system performance is improved.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A dynamic resource allocation method for a multicarrier wireless communication system including at least one base station allocating resources to a plurality of subscriber stations (SSs) according to channel status information received from the plurality of SSs, comprising the steps of:
    determining if each of the plurality of SSs supports subchannel-based dynamic resource allocation;
    allocating resources to an SS on a subchannel basis, if the SS supports the subchannel-based dynamic resource allocation; and
    allocating resources to the SS on a burst basis, if the SS does not support the subchannel-based dynamic resource allocation;
    wherein allocating resources on the subchannel basis comprises the steps of:
        transmitting a second-type downlink MAP information element (DL-MAP IE) to the SS;
        receiving channel status information on the subchannel basis from the SS; and
        modulating and coding data for the SS on the subchannel basis according to the channel status information.

2. The dynamic resource allocation method of claim 1, wherein the step of allocating resources on the burst basis comprises the steps of:
    transmitting a first-type DL-MAP IE to the SS;
    receiving channel status information on the burst basis from the SS; and
    modulating and coding data for the SS on the burst basis according to the channel status information.

3. The dynamic resource allocation method of claim 2, further comprising the steps of:
    mapping the subchannel-based modulated and coded signal and the burst-based modulated and coded signal to one frame; and
    transmitting the frame.

4. The dynamic resource allocation method of claim 1, wherein the step of allocating resources on the burst basis comprises the steps of:
    transmitting a first-type DL-MAP IE to the SS;
    receiving channel status information on the burst basis from the SS; and
    modulating and coding data for the SS on the burst basis according to the channel status information.

5. A dynamic resource allocation method an orthogonal frequency division multiple access (OFDMA) wireless communication system including at least one base station allocating resources to a plurality of subscribers stations (SSs) according to channel status information received from the plurality of SSs, comprising the steps of:
    transmitting a downlink MAP (DL MAP) to the plurality of SSs for access to DL information, wherein the DL MAP includes a downlink MAP information element (DL-MAP IE) for each subchannel;
    receiving channel status information on a subchannel basis from the plurality of SSs according to information of the DL MAP; and
    dynamically allocating resources on the subchannel basis to bursts to be delivered to the plurality of SSs according to the channel status information and the DL MAP information;
    wherein the DL-MAP IE has a MAP structure determined by a MAP type field; and
    wherein bits of the MAP type field represent a Common Traffic Channel(CTCH) allocation, a periodic allocation, a subchannel selection AMC (SS-AMC), and an extended CID, which are sequentially in an order from a Most Significant Bit (MSB) to a Least Significant Bit (LSB).

6. The dynamic resource allocation method of claim 5, wherein the MAP type field is 4 bits.

7. The dynamic resource allocation method of claim 5, wherein the resources allocating step comprises allocating resources on the subchannel basis when the SS-AMC bit is 1.

8. The dynamic resource allocation method of claim 7, wherein the resources allocating step further comprises allocating resources on a burst basis when the SS-AMC bit is 0.

* * * * *